United States Patent [19]
Clar et al.

[11] Patent Number: 6,135,578
[45] Date of Patent: *Oct. 24, 2000

[54] MOTOR VEHICLE BRAKING METHOD WHICH PREVENTS BRAKE PEDAL HARDENING DURING AN AUTOMATIC BRAKING PROCESS

[75] Inventors: Wolfgang Clar, Waiblingen; Walter Kupfer, Weinstadt; Gustavo Brausch, Stuttgart, all of Germany

[73] Assignee: DaimlerChrysler AG, Stuttgart, Germany

[*] Notice: Under 35 U.S.C. 154(b), the term of this patent shall be extended for 666 days.

[21] Appl. No.: 08/832,960

[22] Filed: Apr. 4, 1997

Related U.S. Application Data

[63] Continuation of application No. 08/758,297, Dec. 3, 1996, abandoned, which is a continuation of application No. 08/395,110, Feb. 27, 1995, abandoned.

[30] Foreign Application Priority Data

Feb. 25, 1994 [DE] Germany ............................ 44 06 128

[51] Int. Cl.$^7$ ................ B60T 8/60; B60T 8/48; B60T 13/68
[52] U.S. Cl. ........................... 303/114.3; 303/189
[58] Field of Search ............ 303/114.1, 114.2, 303/114.3, 116.2, 116.1, 186, 164, 189

[56] References Cited

U.S. PATENT DOCUMENTS

| | | | |
|---|---|---|---|
| 4,568,130 | 2/1986 | Leiber | 303/122.11 |
| 4,585,281 | 4/1986 | Schnürer | 303/116.2 |
| 4,805,103 | 2/1989 | Matsuda | 303/189 |
| 5,020,863 | 6/1991 | Yoshino | 303/189 |
| 5,350,225 | 9/1994 | Steiner et al. | 303/114.3 |
| 5,388,897 | 2/1995 | Yared et al. | 303/114.3 |

FOREIGN PATENT DOCUMENTS

| | | |
|---|---|---|
| 91 10 739 | 10/1991 | Germany . |
| 40 28 290 C1 | 1/1992 | Germany . |
| 41 02 496 A1 | 2/1992 | Germany . |
| 43 25 940 C1 | 12/1994 | Germany . |
| 63-232055 | 9/1988 | Japan . |
| 2-501134 | 4/1990 | Japan . |
| 402141357 | 5/1990 | Japan ................ 303/189 |
| 2 086 508 | 5/1982 | United Kingdom . |
| 2 283 792 | 5/1995 | United Kingdom . |

*Primary Examiner*—Matthew C. Graham
*Attorney, Agent, or Firm*—Evenson, McKeown, Edwards & Lenahan, P.L.L.C.

[57] ABSTRACT

In a method for carrying out an automatic braking operation for motor vehicle with an anti-lock system, the pedal position and the brake pressure for the wheels not subjected to ABS control are correlated during the automatic braking operation such that the brake pressure is no greater than would correspond to the position of the brake-actuating device in the case of a normal braking operation. Rapid braking of these wheels is achieved while the pedal position continues to represent a reliable measure of the brake pressure.

14 Claims, 1 Drawing Sheet

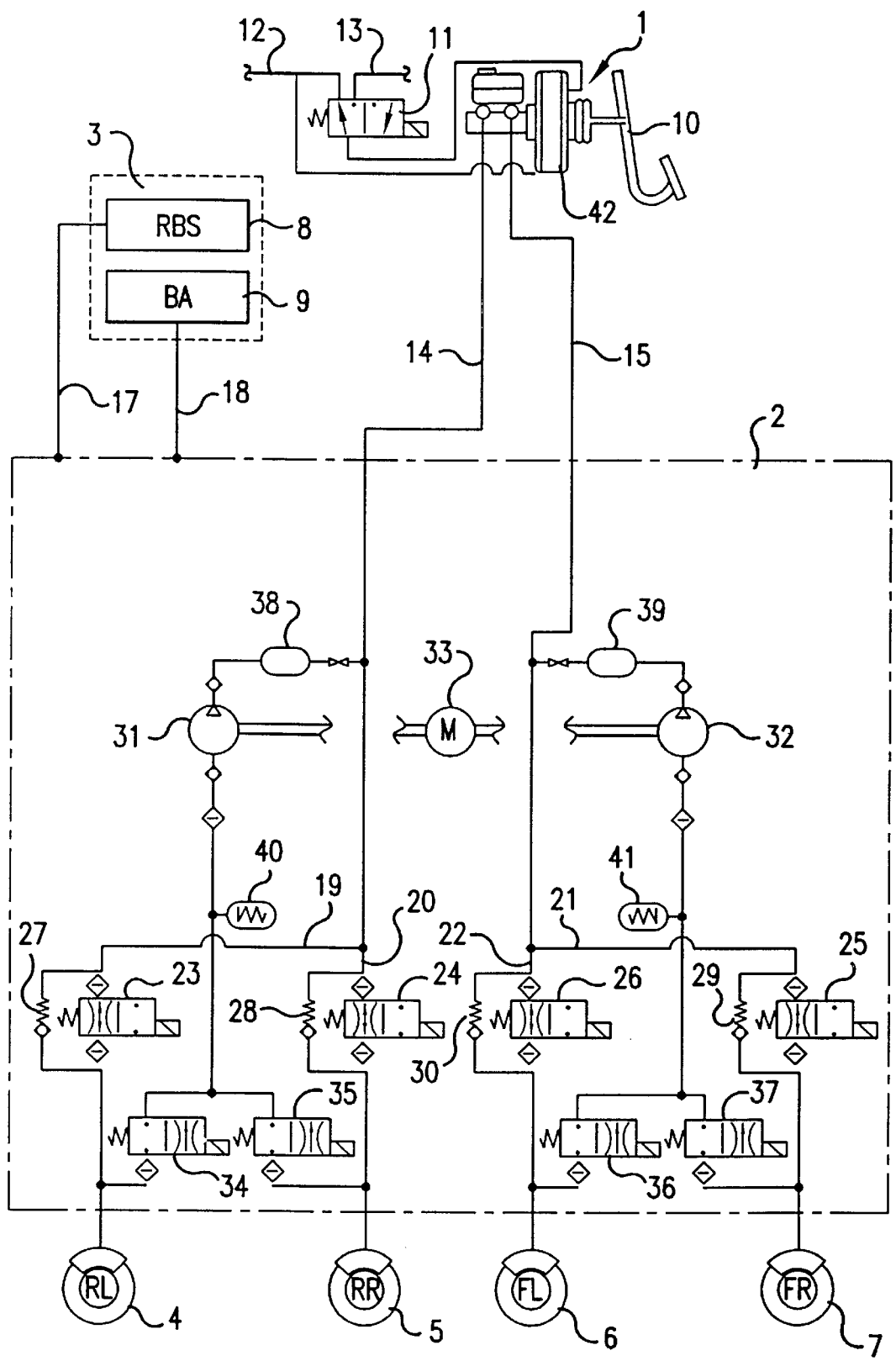

MOTOR VEHICLE BRAKING METHOD WHICH PREVENTS BRAKE PEDAL HARDENING DURING AN AUTOMATIC BRAKING PROCESS

This application is a continuation of application Ser. No. 08/758,297 filed Dec. 3, 1996 now abandoned, which is a continuation of Ser. No. 08/395,110, filed on Feb. 27, 1995 now abandoned.

BACKGROUND AND SUMMARY OF THE INVENTION

The present invention relates to a method for carrying out an automatic braking operation for a motor-vehicle brake system with an anti-lock system, and more particularly, to a method used in a system with a manually operable brake actuating device, the position of which determines the brake pressure during non-automatic normal braking, and with an anti-lock system (ABS) which detects reaching of the lock-up limit of a wheel and thereupon controls the brake pressure for at least this wheel. This method comprises steps of controlling, via the automatic braking operation, the brake pressure of at least one wheel not subjected to anti-lock system control so as to increase the brake pressure, and using the reaching of the lock-up limit of at least one wheel as the trigger criterion.

German Patent Application P 43 38 065.4, which is not a prior art publication, describes a method in which, in contrast to the method known from German Patent DE 40 28 290 C1 and Offenlegungsschrift DE 41 02 496 A1, in which the exceeding of a predetermined threshold value by the speed of actuation of the brake pedal is used as the trigger criterion for the activation of the automatic braking operation, does not require pedal-travel or pedal-pressure sensors. Instead, use is made of the information on the incipient locking up of at least one wheel, which information is detected and used in any case by the anti-lock system. This represents a useful trigger criterion because the tendency of the wheels to lock up occurs precisely in the critical driving situations in which the wheels not yet subjected to ABS control should likewise be subjected to an automatic braking action.

The automatic braking operation ensures that the wheels which are not yet locked up, because of differences in the skid-resistance properties of the roadway, in vehicle-weight distribution and/or braking-force distribution for example, and are therefore not being subjected to ABS control can be braked in an optimum manner. In order to achieve this optimum braking, the above methods envisage that, for the purpose of carrying out the automatic braking operation for the wheels not subjected to ABS control, the brake pressure should be set automatically to a higher value than would correspond to the instantaneous brake-pedal position. This is achieved by virtue of the fact that, at the beginning of the automatic braking operation, the brake lines leading to the wheels to be supplied with the increased brake pressure are decoupled from the master brake cylinder pressure, which is influenced by the brake pedal, and connected to an additional pressure source. For this purpose, use can, for example, be made of a pressure source already present for carrying out traction control (ASR).

This measure of using an additional pressure source to obtain increased brake pressure results in a so-called hardening of the brake pedal, making it impossible for the driver to gain reliable information on the braking effect at the wheels not subjected to ABS control during the automatic braking operation from the position of the brake pedal and its resistance to further actuation. This is the kind of information which the driver would be accustomed to obtaining during normal braking below the ABS lock-up limit of the wheels. In addition, the use of the additional pressure source results in a displacement of the pedal travel/brake pressure characteristic.

An object of the present invention is to provide a method for carrying out an automatic braking operation so that a vehicle can be braked in as short as possible a braking distance in critical driving situations while as far as possible maintaining the braking information available to the driver.

The foregoing object has been achieved in accordance with the present invention by providing that, during the automatic braking operation, the wheel not subjected to ABS control, of which there is at least one, and the mechanical brake-actuating device such are acted upon that the increased brake pressure for the at least one wheel not subjected to ABS control, does not exceed the brake-pressure value represented by the respective instantaneous position of the mechanical brake-actuating device.

As a trigger criterion for the automatic braking operation, use is made of the detection of the locking up of at least one wheel by the anti-lock system, with the development that the activation of the automatic braking operation takes place as soon as both wheels of one axle reach the lock-up limit and/or once the lock-up limit or the activation of the ABS is maintained for a certain time period. This approach eliminates the need for an additional sensor system for the detection of the demand for high braking forces in critical driving situations.

The brake pressure supply to each of the wheels at which locking up is detected and, more generally, to the wheels on the same axle as such wheels is controlled in the usual manner by the ABS during the automatic braking operation. In virtually all cases, the wheels on different axles lock up at different times due to differences in axle-load and/or braking-force distribution. However, as soon as the ABS control partially comes into effect, the driver feels a corresponding braking effect and therefore instinctively slackens off in his further depression of the brake pedal.

The purpose of the automatic braking operation is to provide better braking of the wheels which are, at least initially, not subjected to ABS control than is normally achieved solely by the action of the driver on the brake pedal. This is achieved by producing a certain brake pressure to be reached more rapidly and, since the driver frequently does not brake hard enough, generally also by setting a higher brake pressure than that demanded by the driver.

In order to provide the driver at all times, even during the automatic braking operation, with a brake-pedal feel which represents this increased brake pressure, or at least does not give him the impression of a lower brake pressure than that set, the brake-pressure increase takes place, according to the present invention, in correlation with the position of the brake-pedal-actuating device. The braking information which the driver continues to receive as a result furthermore makes it easier for him or her to take over control of the brakes again in a suitable manner when the automatic braking operation has been aborted on detection of an abort criterion, for which purpose one of the criteria known from the prior art cited at the outset, for example the return of the brake pedal beyond a specified position, can be used.

Not only the wheel not subjected to ABS control but, furthermore, the mechanical brake-actuating device are acted upon so that the latter yields to the demand for actuation by the driver at every point of the automatic braking operation, which requires little expenditure of force for the purpose, at least to the extent that its instantaneous position always represents a brake-pressure value which is at least as large as the set increased brake pressure at the wheel not subjected to ABS control.

The brake-pressure increase is preferably accomplished by appropriate control of a conventional brake servo unit with a brake pedal as a brake-actuating device. The setting of a higher brake-pressure value during the automatic braking operation than would correspond to the brake-pedal position during normal braking operations can be avoided by using, for example, an appropriate brake control unit to produce the increased brake pressure via a pressure source, with the brake fluid being taken from a master brake cylinder adjoining the brake pedal, and the brake pedal thereby being automatically adjusted accordingly at the same time. With such an implementation, the use of a further pressure source, from a traction control system for example, for increasing the brake pressure during the automatic braking operation is possible but not essential, and the method is thus suitable also for brake systems which have only an anti-lock system but not a traction control system and additional brake-pressure sources provided for the latter.

According to another aspect of the method of the present invention the brake pressure is increased in a variable manner to match the vehicle deceleration already achieved in each particular case, it being possible for the increased brake pressure to be adjusted to different values suitable in each particular case in the course of the automatic braking operation. Such a plausibility check of the deceleration achieved is advantageous particularly in those cases where the ABS control system responds at one wheel not because of a high overall braking-force demand but due to a locally low friction coefficient of the roadway, e.g. in the case of an icy patch travelled over by just one or two wheels, since unintentionally great and abrupt vehicle deceleration which might otherwise occur in these special situations due, for example, to a maximum brake-pressure increase is avoided by this matching of the increased brake-pressure value to the instantaneous deceleration present at a particular moment.

BRIEF DESCRIPTION OF THE DRAWING

These and other objects, features and advantages of the present invention will become more readily apparent from the following detailed description thereof when taken in conjunction with the accompanying sole FIGURE in the form of a schematic diagram of a dual-circuit brake system of a motor vehicle with an anti-lock system.

DETAILED DESCRIPTION OF THE DRAWING

The dual-circuit brake system shown for braking two rear-axle wheels 4, 5 and two front-axle wheels 6, 7 comprises, in a conventional manner, a brake servo unit 1, from which the two brake circuits 14, 15 lead, a hydraulic unit 2 connected to the brake circuits 14, 15 and a brake control unit 3 which comprises an ABS control unit 8 and a control unit 9 to control the automatic braking operation. Two connecting lines 17, 18 leading from the ABS control unit 8 and the control unit 9 for the automatic braking operation to the hydraulic-unit block 2 are shown schematically to represent the various required sensor and control lines for the brake control unit 3.

The conventional construction of the hydraulic unit 2 with its anti-lock control function may be described briefly as follows. The two incoming main brake lines 14, 15 branch into the brake lines 19 to 22 leading to the brake cylinders of the individual wheels 4 to 7. Arranged in each of brake lines 19 to 22 is an inlet valve in the form of a solenoid valve 23 to 26 that can be driven by the ABS control unit 8 and a non-return valve 27 to 30 connected in parallel. The solenoid valves 23 to 26 are closed upon initiation of an ABS control operation in order to prevent a further increase in brake pressure at the corresponding wheel.

To carry out the ABS control function, each brake circuit 14, 15 is provided with a return pump 31, 32 operated by a common motor 33. The inlet side of each return pump 31, 32 is connected via two solenoid valves 34, 35 and 36, 37, respectively arranged in parallel and acting as outlet valves to the two individual brake-line sections situated upstream of the wheel brake cylinders and belonging to the respective brake circuit. The outlet side of each return pump 31, 32 is connected via a damper 38, 39 and a restrictor to the respective main brake line 14, 15. A low-pressure accumulator 40, 41 is provided upstream of the inlet side of each of the return pumps 31, 32 for the purpose of collecting at that point volumes of fluid due to the switching of the valves which cannot be pumped back quickly enough by the return pump 31, 32.

The brake servo unit 1 includes a brake pedal 10 as a brake-actuating device and a vacuum brake booster 42 which is connected continuously on one pressure side to a vacuum line 12, while its other pressure side can be connected by way of a controllable solenoid valve 11 either to this same vacuum line 12 or to a line 13 leading to atmosphere. This solenoid valve 11 is switched by the control unit 9 for the automatic braking operation. Connection to the atmospheric line 13 results in a maximum pressure disequilibrium in the vacuum brake booster 42 and hence to the production of a maximum brake pressure in the main brake lines 14, 15.

The operation of the above-described dual-circuit braking system of the construction described above will now be explained in greater detail, particularly as regards the performance of an automatic braking operation.

When there is no demand for braking or only a normal demand which does not lead to lock-up of a wheel, the solenoid valve 11 for the brake booster 42 is switched to the vacuum line 12. In the case of normal braking of this kind, a light actuation of the brake pedal 10 builds up a master brake cylinder pressure which is clearly dependent on the pedal position. This pressure is fed into the two main brake lines 14, 15 and from there passes via the individual brake lines 19 to 22 to the wheel brake cylinders 4 to 7. In this state, the interposed inlet solenoid valves 23 to 26 are open, while the outlet valves 34 to 37 upstream of the return pumps 31, 32 are closed.

As soon as, starting from this point, there is a somewhat greater braking-force demand leading to locking up of at least one wheel as detected by appropriate ABS sensors, which is generally a front-axle wheel in the case of a driven rear axle due to the braking-force distribution, the ABS control unit 8 initiates an ABS control operation for this wheel. For this purpose, the ABS control unit 8 closes the previously open inlet solenoid valve of this wheel and, with a time delay, opens the associated outlet valve for the purpose of brake-pressure reduction at the wheel of this axle and, in addition, the return pumps are actuated by the activation of the motor 33.

The locking up of a first wheel or the activation of ABS control for this wheel is detected by the control unit 9 for carrying out the automatic braking operation. Whereas, at this point in time, in earlier brake systems the brake pressure for the wheels not being subjected to ABS control continued to comply with the brake-pedal force input by the driver, the control unit 9 performs an automatic braking operation for the other wheels as well if the locking up of a first wheel or the activation of ABS control continues beyond a preselected short time period. For this purpose, the control unit 9 switches over the solenoid valve 11 upstream of the vacuum brake booster 42 from the vacuum line 12 to the atmospheric line 13. The immediate inflow of air to the associated pressure side of the brake booster 42 which results therefrom produces a very rapid brake-pressure rise in the master brake cylinder to the maximum possible value. In particular, this brake-pressure rise takes place more rapidly than that which could be achieved by the driver by actuating the brake pedal 10. If the solenoid valve positions of the hydraulic unit 2 remain the same, this rapidly increasing master brake cylinder pressure pressurizes only the wheel brake cylinders of the wheels not being subjected to ABS control, not the wheel brake cylinders subjected to ABS control owing to the fact that the inlet valves are shut off during ABS control. As a result, the brake pressure at the wheels not yet subjected to ABS control rises very rapidly and, if the braking operation is continued, this can, for example, also lead to the locking up of a wheel on this axle. The ABS control unit 8 detects this condition and thereupon performs an ABS control operation for this second brake circuit as well. Thus, the automatic braking operation is continued in this situation by an ABS control operation on both axles.

Because the above-described brake-pressure increase when starting the automatic braking operation takes place by way of the master brake cylinder itself, a further pressure source and/or the presence of a traction control system are not required for carrying out the automatic braking operation. Moreover, the provision of the increased brake pressure via the vacuum brake booster 42 by appropriate control of the associated solenoid valve 11 via the control unit 9 for the automatic braking operation has the effect that the brake pedal 10 is moved in synchronism with the pressure increase. Thus, the brake-pedal position is a representative measure of the brake pressure acting on the wheels not subjected to ABS control, even during the automatic braking operation.

This approach avoids the so-called hardening of the brake pedal which occurs with the conventional procedure in which the master brake cylinder is completely decoupled from the wheel brake cylinder feed lines and the latter are supplied by a further pressure source, e.g. by a traction control system. The driver thus has more reliable information on the effective brake pressure during the automatic braking operation, since the pedal position corresponds to that at a similar brake pressure in the case of a non-automatic braking operation. A displacement of the pedal travel/brake pressure characteristic is furthermore avoided by the method under consideration if the volume of fluid for the superelevation of the pressure is taken from the master brake cylinder.

The automatic braking operation is finally ended when a preselected abort criterion is detected. Such abort criteria are generally well known and are also mentioned, for example, in German Patent Application 43 25 940.5, which is not a prior art publication. As an example, the procedure is aborted when the brake pedal has moved back beyond a predetermined position in the direction of the starting position.

The method described for carrying out an automatic braking operation makes it possible to brake the vehicle as rapidly as possible in a critical driving situation in that, following initiation of an ABS control operation for some of the wheels, an automatic braking operation is performed for the other wheels as well in such a way that the brake pressure is increased as rapidly as possible there. The pedal position is adjusted so that it always represents the instantaneous brake pressure. In particular, an automatic brake-pressure increase of this kind can take place more rapidly than it is possible for the driver to achieve by acting on the brake pedal. Nevertheless, the driver still has the information on the brake pressure set from the adjustment of the pedal position. It is self-evident that the procedure according to the present invention is suitable not only for the brake systems described above but also for other brake systems with ABS and, if required, traction control, for which purpose it is, in general, necessary merely to make modifications in terms of the control of conventional brake systems.

As at alternative to immediate setting of the maximum possible brake pressure as the increased brake pressure during the automatic braking operation for the wheels not subjected to ABS control, it is advantageous to provide for the setting of the value of the increased brake pressure as a function of the respective instantaneous vehicle deceleration. Since the activation of ABS control for at least one wheel is then used as the trigger criterion for carrying out an automatic braking operation, the automatic braking operation cuts in not only when the driver indicates by a very sharp actuation of the pedal that he or she desires a correspondingly sharp deceleration but also in cases of a local decrease in the friction coefficient of the surface of the roadway affecting only one wheel or one side of the vehicle, e.g. an icy patch of roadway on one side crossed on a bend by only one front wheel. The intervention of the ABS prevents locking up of the wheel travelling over the patch with a low friction coefficient without causing a noticeable vehicle deceleration, which is also not desired by the driver. If the automatic braking operation triggered by this intervention of the ABS were immediately to provide in this special situation the maximum possible brake pressure for the wheels not subjected to ABS control, this could lead to an unintentionally sharp vehicle deceleration due to the relatively high friction coefficient at the other wheels. The following measure avoids this.

Initially, a characteristic for the increased brake pressure is specified as a function of the vehicle deceleration and, according to this characteristic, the increased brake-pressure value is set as a function of the respectively detected deceleration. This characteristic rises monotonically, with the result that the maximum possible brake pressure is only established after a high vehicle deceleration has already been achieved by virtue of pedal actuation by the driver and/or the beginning of an ABS control intervention, while the brake-pressure increase in the case where the preceding deceleration is lower is likewise lower. As soon as a first ABS control intervention is then detected and the automatic braking operation is thus triggered, the instantaneous deceleration is simultaneously measured at this point in time and the increased brake-pressure value set in accordance with the specified characteristic. This brake-pressure value is maintained beyond a predetermined short time period, after which the vehicle deceleration is interrogated again and the brake-pressure increase is reset in accordance with the newly detected deceleration value and the specified characteristic. This measure guarantees optimum adaptation of the braking effect brought about by the automatic braking operation to the respective braking situation which has led to the triggering of the automatic braking operation during the entire period of braking.

In normal situations, with a uniform friction coefficient, the ABS control system responds only when the deceleration and hence braking force desired by the driver is relatively high. At the beginning of an automatic braking operation triggered in this way, the already high deceleration has the effect that a correspondingly high value is chosen for the increased brake pressure. As a result, the wheels which are initially not subjected to ABS control reach their lock-up limit very rapidly, always with the proviso, of course, that the abort criterion for the automatic braking operation has not been fulfilled beforehand. However, in the special situations in which the ABS responds because of a locally low friction coefficient but at this point in time of the triggering of the automatic braking operation a high vehicle deceleration is neither intended nor demanded, a correspondingly low increased brake-pressure value is then set and unintentionally abrupt vehicle deceleration thus does not occur in these special driving situations.

The method can also be used, for example, in conjunction with an additional traction control system, with brake pedal adjustment, for which purpose the fluid volume is preferably taken from the master brake cylinder. The use of the method for brake systems with an electronic brake booster is also within the contemplation of the present invention, with the said brake booster serving simultaneously as a control unit for carrying out the automatic braking operation.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for carrying out an automatic braking operation for a motor-vehicle brake system with a manually operable brake-actuating device, the position of which determines the brake pressure during non-automatic normal braking, a control for the automatic braking operation and an anti-lock system (ABS) which detects when a lock-up limit of a wheel is reached, thereupon controls the brake pressure for the wheel and triggers the control for the automatic braking operation, comprising the steps of actuating an automatic braking operation upon reaching a trigger criterion based at least on a condition that one or more wheels has reached a lock-up limit to control the brake pressure of at least one wheel not subjected to ABS control so as to increase the brake pressure independently of the manually operable brake-activating device, and during the automatic braking operation, synchronously acting upon the at least one wheel not subjected to ABS control and the mechanical brake-actuating device such that the increased brake pressure for the at least one wheel not subjected to ABS control corresponds to the brake-pressure value represented by the respective instantaneous position of the mechanical brake-actuating device.

2. The method according to claim 1, wherein the reaching of the lock-up limit by both wheels of one axle is used as the trigger criterion.

3. The method according to claim 1, wherein the triggering of the automatic braking operation takes place only when one of the attainment of the lock-up limit and an activation of the anti-lock system takes place over a time period longer than a specified time period.

4. The method according to claim 3, wherein the attainment of the lock-up limit by both wheels of one axle is used as the trigger criterion.

5. The method according to claim 1, wherein the automatic braking operation includes a brake-pressure increase performed by a brake servo unit of the brake system.

6. The method according to claim 5, wherein the triggering of the automatic braking operation takes place only when one of the attainment of the lock-up limit and an activation of the anti-lock system takes place over a time period longer than a specified time period.

7. The method according to claim 6, wherein the attainment of the lock-up limit by both wheels of one axle is used as the trigger criterion.

8. The method according to claim 1, wherein the automatic braking operation includes a brake-pressure increase to the lock-up limit of the at least one wheel by at least one pressure source, whereby the required brake-fluid volume is taken from a master brake cylinder adjoining the mechanical brake-actuating device.

9. The method according to claim 8, wherein a traction control system pressure source is the at least one pressure source.

10. The method according to claim 9, wherein a pressure source and control valves of a traction control system provided for at least one driven axle are used as the pressure source and control valves for carrying out the automatic braking operation for wheels of the at least one axle.

11. The method according to claim 1, wherein the automatic braking operation includes a brake-pressure increase at the wheels of axles which do not include the at least one wheel which has first reached the lock-up limit.

12. The method according to claim 1, wherein, during the automatic braking operation, the maximum brake pressure producible by the brake system is set as the brake pressure for the at least one wheel not subjected to ABS control.

13. The method according to claim 1, wherein, during the automatic braking operation, the increased brake pressure for the at least one wheel not subjected to ABS control is set as a function of previously detected instantaneous vehicle deceleration.

14. The method according to claim 13, wherein, to set the increased brake pressure during the automatic braking operation, the instantaneous vehicle deceleration is detected at predetermined time intervals and the increased brake pressure is in each case set to a pressure value specified for this deceleration value with reference to a brake-pressure increase/vehicle deceleration characteristic.

* * * * *